United States Patent
Parmar et al.

(10) Patent No.: US 11,996,236 B2
(45) Date of Patent: May 28, 2024

(54) CURRENT BALANCING APPARATUS AND METHODS FOR PARALLEL CONNECTED CIRCUIT BREAKERS

(71) Applicant: Eaton Intelligent Power Limited, Dublin (IE)

(72) Inventors: Vinod Kumar Parmar, Pune (IN); Amit Ashok Khendad, Pune (IN); Daniel Edward Hrncir, Jr., Arden, NC (US)

(73) Assignee: Eaton Intelligent Power Limited, Dublin (IE)

(*) Notice: Subject to any disclaimer, the term of this patent is extended or adjusted under 35 U.S.C. 154(b) by 135 days.

(21) Appl. No.: 17/330,996

(22) Filed: May 26, 2021

(65) Prior Publication Data
US 2022/0384080 A1    Dec. 1, 2022

(51) Int. Cl.
- *H02B 1/04* (2006.01)
- *H01F 7/20* (2006.01)
- *H02B 1/20* (2006.01)

(52) U.S. Cl.
CPC ............... *H01F 7/20* (2013.01); *H02B 1/04* (2013.01); *H02B 1/20* (2013.01)

(58) Field of Classification Search
None
See application file for complete search history.

(56) References Cited

U.S. PATENT DOCUMENTS

| | | | |
|---|---|---|---|
| 4,020,440 A * | 4/1977 | Moerman | H02H 9/021 336/155 |
| 6,563,406 B2 | 5/2003 | Beatty et al. | |
| 7,119,642 B2 | 10/2006 | Flores et al. | |
| 7,208,852 B2 | 4/2007 | Colombo et al. | |
| 8,168,910 B2 | 5/2012 | Schlaug et al. | |
| 9,779,903 B2 | 10/2017 | Nereau | |
| 9,872,403 B2 * | 1/2018 | Zeng | H05K 5/0213 |
| 10,998,760 B2 * | 5/2021 | Trzemzalski | H02J 9/062 |
| 2012/0014042 A1 * | 1/2012 | Tallam | H01F 3/04 361/679.01 |
| 2013/0207763 A1 * | 8/2013 | Wagoner | H01F 27/22 336/60 |
| 2018/0123327 A1 * | 5/2018 | Bellows | H02B 1/36 |
| 2018/0191236 A1 * | 7/2018 | Wagoner | H02M 1/126 |
| 2021/0265830 A1 * | 8/2021 | Mazur | G05B 19/0428 |

FOREIGN PATENT DOCUMENTS

| | | |
|---|---|---|
| CN | 110224413 | 9/2019 |
| CN | 110646663 | 1/2020 |

\* cited by examiner

*Primary Examiner* — Courtney L Smith
(74) *Attorney, Agent, or Firm* — Stanek Lemon Crouse & Meeks, PA

(57) ABSTRACT

Currents may be balanced in an apparatus including first and second conductors electrically connected to a third conductor and configured to be coupled to respective first and second parallel-connected circuit breaker switches using at least one magnetic core positioned adjacent at least one of the first and second conductors to introduce an inductance in the at least one of the first and second conductors. The at least one core may include at least one magnetic material ring that at least partially surrounds the at least one of the first and second conductors. The at least one magnetic material ring may include a plurality of laminated layers of grain-oriented steel.

20 Claims, 7 Drawing Sheets

CURRENT BALANCING APPARATUS AND METHODS FOR PARALLEL CONNECTED CIRCUIT BREAKERS

BACKGROUND

Electrical power distribution systems typically include circuit breakers to provide protection against faults that may injure personnel and damage equipment. In some applications, multiple circuit interrupting switches may be connected in parallel (e.g., by connecting single-pole circuit breaker units in parallel or by connecting poles of a multi-pole circuit breaker unit in parallel) to increase current capacity. An example of such a connection is shown in FIG. 1, showing a double-pole circuit breaker unit 10 including first and second switches 12a, 12b by first and second line conductors 20a, 20b that are connected in common to a third line conductor 30 and first and second load conductors 40a, 40b that are connected in common to a third load conductor 50.

A potential problem with such arrangements is that there can be unequal current sharing between the switches 12a, 12b. For example, U.S. Pat. No. 6,563,406 to Beatty et. al. describes current sharing issues caused by non-simultaneous opening of such parallel-connected breaker switches.

SUMMARY

Some embodiments provide an apparatus including first and second conductors electrically connected to a third conductor and configured to be coupled to respective first and second circuit breaker switches. The apparatus further includes at least one magnetic core positioned adjacent at least one of the first and second conductors. The at least one core may include at least one magnetic material body (e.g., a ring of magnetic material) that at least partially surrounds the at least one of the first and second conductors. The at least one ring may include, for example, a plurality of laminated layers of the magnetic material (e.g., layers of grain-oriented steel). The at least one ring may have at least one air gap.

In further embodiments, the first and second conductors may include respective first and second bus bars extending in parallel in a first direction. The third conductor may include a third bus bar extending in a second direction perpendicular to the first direction. The first and second bus bars may have first ends connected to the third bus bar on opposite sides of the third bus bar and second ends configured to be electrically connected to at least one circuit breaker unit including the first and second circuit breaker switches.

The apparatus may further include fourth and fifth bus bars extending in parallel in the first direction parallel to the first and second bus bars and a sixth bus bar extending in the second direction parallel to the third bus bar. First ends of the fourth and fifth bus bars may be connected to the sixth bus bar at opposite sides of the sixth bus bar. The magnetic ring may at least partially surround at least one of the first and second bus bars between the first and second ends thereof.

According to some embodiments, an apparatus includes a circuit breaker, first and second bus bars electrically connected to respective first and second contacts of the circuit breaker, and a third bus bar electrically connected to the first and second bus bars. The apparatus further includes at least one ring of magnetic material at least partially surrounding at least one of the first and second bus bars between the third bus bar and the circuit breaker. The at least one ring may include a plurality of laminated layers of the magnetic material and may have at least one air gap. The first and second bus bars may extend in parallel in a first direction and the third bus bar may extend in a second direction perpendicular to the first direction. The first and second bus bars may be attached to the third bus bar at opposite sides of the third bus bar.

Still further embodiments provide methods of balancing currents in an apparatus comprising first and second conductors electrically connected to a third conductor and configured to be coupled to respective first and second parallel-connected circuit breaker switches. The methods include positioning at least one magnetic core adjacent at least one of the first and second conductors to introduce an inductance in the at least one of the first and second conductors. The at least one core may include at least one magnetic material ring that at least partially surrounds the at least one of the first and second conductors. The at least one magnetic material ring may include a plurality of laminated layers of grain-oriented steel.

DETAILED DESCRIPTION

Figure 1:
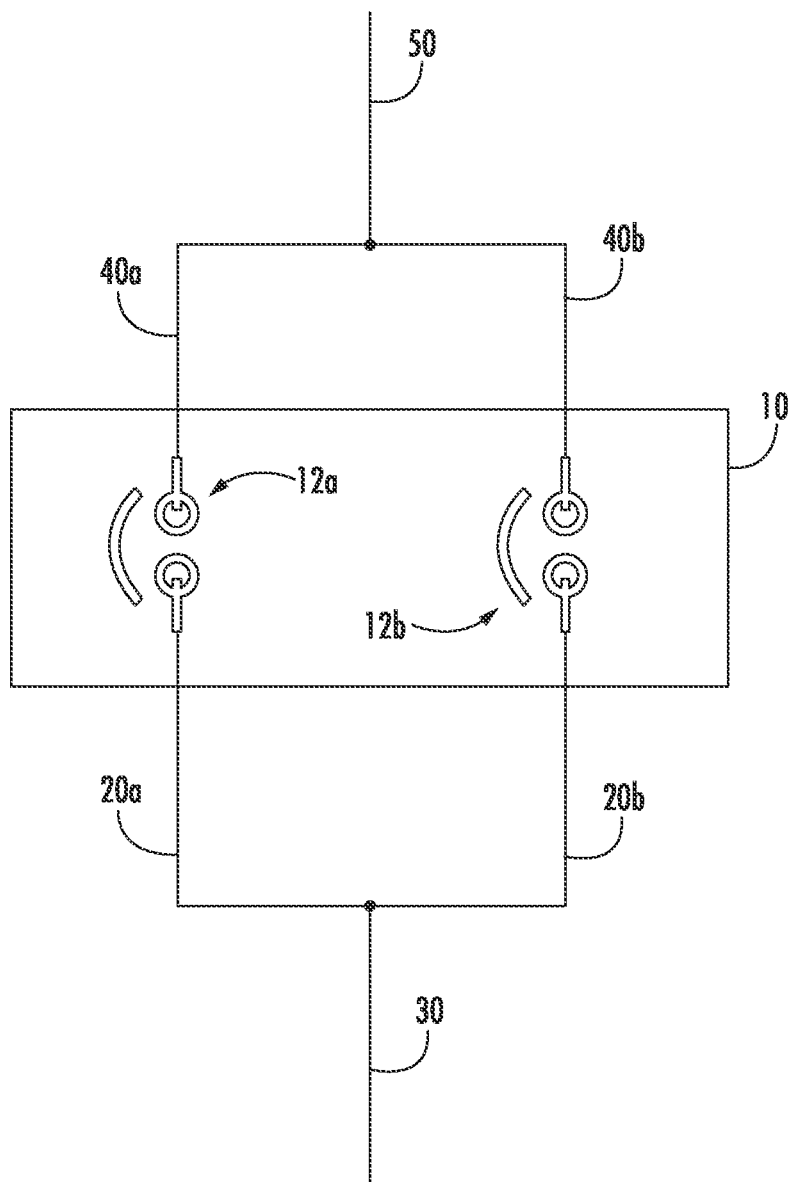
FIG. 1 illustrates a conventional parallel-connected circuit breaker arrangement.

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Some embodiments of the inventive concept arise from a realization that parallel-connected circuit breaker arrangements can forms conducting loops and circulating current induction in the loops can lead to thermal problems. In particular, circulating current can add to load current in one pole and subtract in another pole, which can lead to a current imbalance and unequal current sharing between the poles of a breaker.

The amount of imbalance may be dependent on mutual coupling with other phases. Two identical parallel paths may have equal resistance and inductance values, but their mutual coupling with other phases can be different. Due to such differences in mutual coupling, induced voltages across the paths can be different and, thus, may cause a circulating current in a loop including the parallel conducting paths. The circulating current can cause imbalance between the parallel-connected paths and give rise to an undesirable temperature rise in one of the paths.

In some embodiments, such a current imbalance may be reduced or eliminated by placing at least one magnetic core adjacent at least one of a group of paralleled conductors for a multipole breaker arrangement. The core may take the form of a magnetic material ring that at least partially surrounds one of the conductors. Such a ring may be particularly effective when placed on a breaker connection conductor section that is relatively short, e.g., on a short bus bar section used to connect a larger bus bar to a circuit breaker, as the relatively low resistance of a shorter conductor section means that the ring does not have to be of inordinate size to create an inductance sufficient to achieve desirable current balancing. In further embodiments, the ring may include a plurality of laminated grain-oriented steel (electric steel or transformer steel) layers to reduce eddy currents and prevent undesirable heating. The ring may also include an air gap to provide desirable saturation characteristics.

Figure 2:
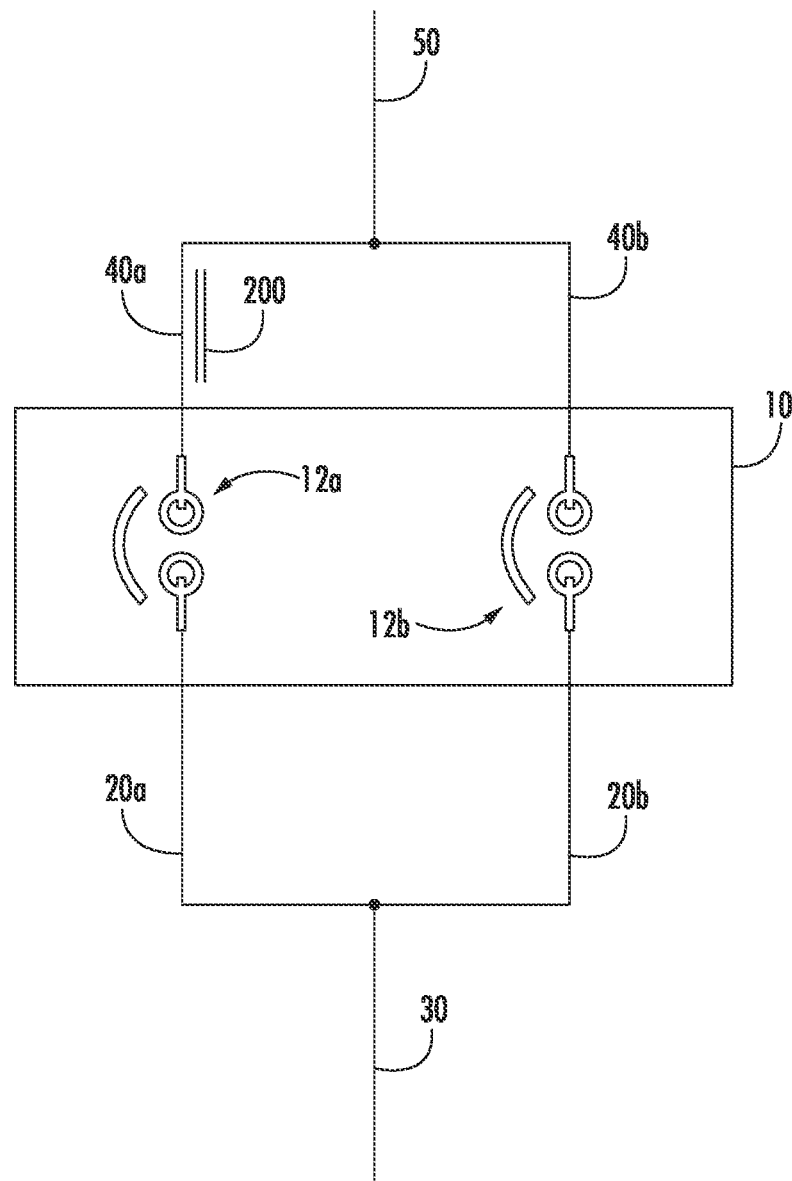
FIG. 2 illustrates a parallel-connected circuit breaker arrangement according to some embodiments of the inventive concept.

FIG. 2 illustrates an apparatus according to some embodiments of the inventive concept. The apparatus includes a double-pole circuit breaker unit 10 including first and second switches 12a, 12b fed by first and second line conductors 20a, 20b that are connected in common to a third line conductor 30. The first and second switches 12a, 12b feed first and second load conductors 40a, 40b that are connected in common to a third load conductor 50. The apparatus further includes a magnetic core 200, here shown as positioned adjacent one of the load conductors 40a between the circuit breaker switch 12a and a point at which the parallel load conductors 40a, 40b are connected in common to the load conductor 50. The magnetic core 200 may provide introduce additional inductance in the load conductor 40a to improve current balance as discussed below.

In some embodiments, the load conductor 40a may be a bus bar section and the core 200 may comprise a ring of magnetic material (e.g., a ring comprising a plurality of laminated grain-oriented steel layers) that at least partially surrounds the bus bar section. It will be appreciated, however, that core 200 may be used with other types of conductors, that more than one such core 200 may be provided, and that the placement of the core 200 may be varied. For example, rather than being placed on a load conductor 40a as illustrated, the core 200 may be placed on a line conductor, such as one of the line conductors 20a, 20b. Generally, placement of the core 200 may be dependent upon the geometry of the line conductors 20a, 20b, the load conductors 40a, 40b and adjacent current-carrying structures, such as conductors for adjacent phases, which can induce circulating currents in the parallel-connected conductors.

Figure 3:
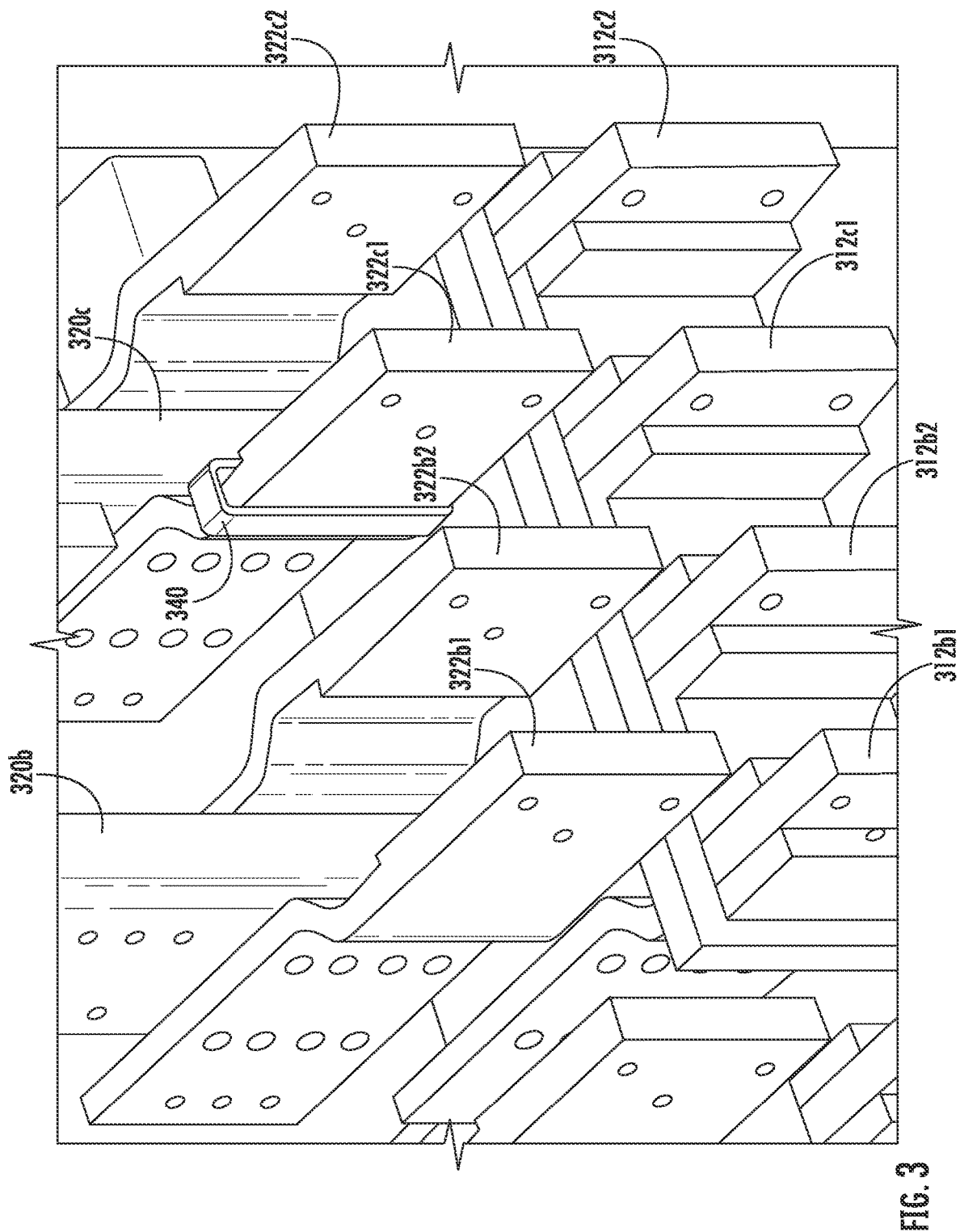
FIG. 3 is a perspective view illustrating a bus bar arrangement with a current balancing magnetic ring according to some embodiments.
Figure 4:
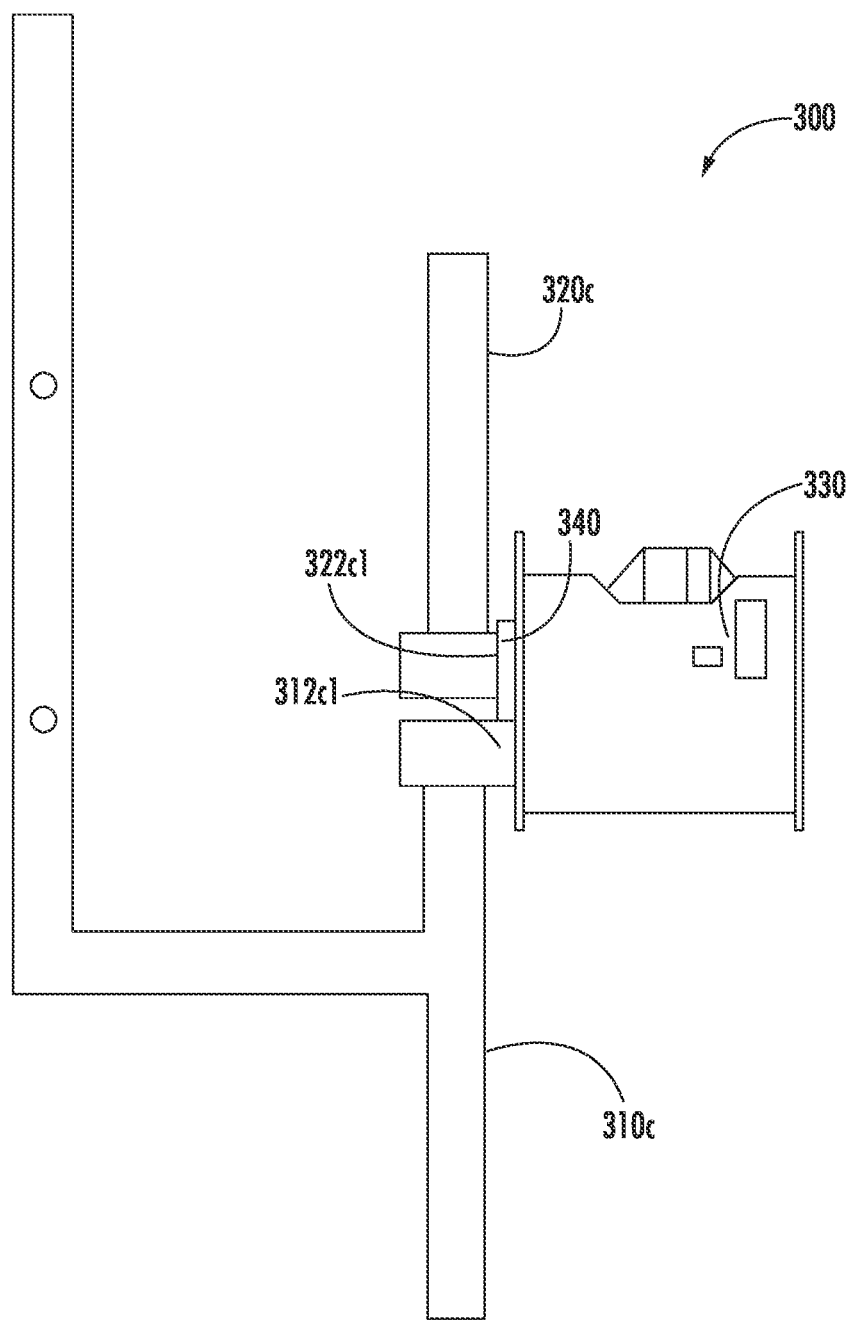
FIG. 4 is a side view of the bus bar arrangement of FIG. 3.

FIGS. 3 and 4 illustrate an example of such an arrangement. In particular, FIGS. 3 and 4 illustrate components of a switchgear 300 that might be used, for example, in an industrial application. Referring to FIG. 3, the switchgear 300 includes vertically-oriented load side bus bars 320a, 320b for respective B and C phases (a similar A-phase arrangement is not shown). First ends of two short parallel-connected bus bar sections 322c1, 322c2 are attached to opposite sides of the C-phase load side bus bar 320c to provide a paralleled electrical interconnection. Similarly, first ends of B-phase bus bar sections 333b1, 322b2 are attached to opposite sides of the second load side bus bar 320b. The bus bar sections 322c1, 322c2, 322b1, 322b2 extend perpendicularly (horizontally) from the load side bus bars 320a, 320b. Second ends of the bus bar sections 322c1, 322c2, 322b1, 322b2 are configured to engage respective contacts (e.g., to be inserted into contact stabs) of a circuit breaker unit 330.

The circuit breaker unit 330 is configured to switchably connect the pair of C-phase bus bar sections 322c1, 322c2 to a corresponding pair of line side bus bar sections 312c1, 312c2 that are connected to a vertically-oriented line C-phase line side bus 310c (similar connections of A and B phase bus bar sections to the circuit breaker unit 330 are not shown). As further shown, a magnetic material ring 340 is positioned around one of the C-phase bus bar sections 322c1 to introduce inductive impedance for current distribution along the lines discussed above.

It will be appreciated that the arrangement shown in FIGS. 3 and 4 is provided for purposes of illustration, and that other embodiments may use different arrangements. For example, more than one magnetic material ring 340 may be provided and/or the magnetic material ring 340 may be positioned on a different bus bar section, such as on one of the B-phase bus bar sections 322b1, 322b2. Generally, placement of a magnetic core as described herein may be dependent on the specific geometry of conductors and adjacent structures. Placement may be determined, for example, by a trial and error process in which the apparatus is operated under representative conditions and an undesirable current distribution detected (e.g., by monitoring relative temperature rise), thus indicating candidate locations where one or more such magnetic cores may be placed to achieve a more desirable current distribution. After placement, current distribution may again be determined to confirm that the magnetic core placement leads to an acceptable current distribution.

Figure 5:
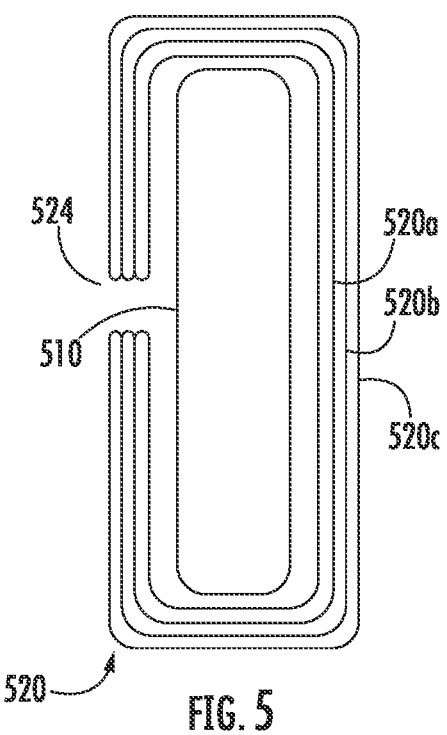
FIGS. 5 and 6 illustrate a laminated magnetic ring according to further embodiments.
Figure 6:
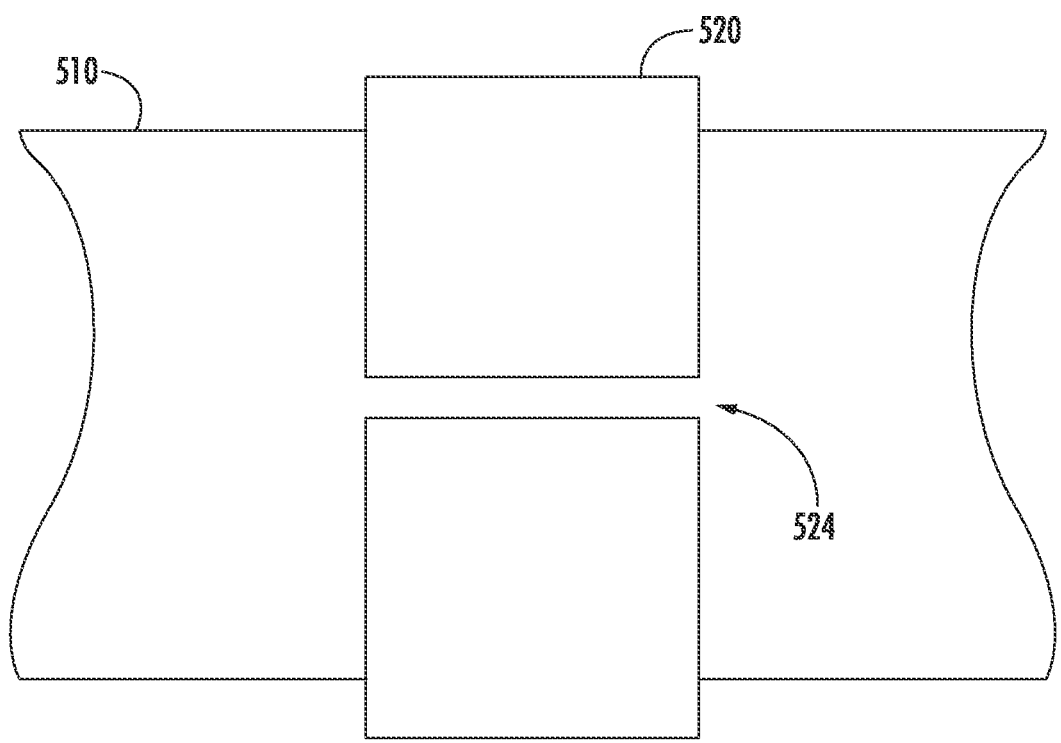

FIGS. 5 and 6 illustrate an example of such a magnetic core according to further embodiments. A magnetic ring 520 for positioning over a bus bar section 510 may comprise a plurality of laminated layers 520a, 520b, 520c. The layers 520a, 520b, 520c may comprise, for example, layers of magnetic material, such as grain-oriented steel ("electrical steel" or "transformer steel"). The ring 520 may also be fabricated such that it includes an air gap 524, which can help to reduce or prevent core saturation. It will be appreciated that the core structure illustrated in FIGS. 5 and 6 serves as an illustration and that other embodiments may use different materials and structures. For example, some embodiments may use other magnetic core materials, such as various iron alloys, iron powders and ferrites and may use shapes other than rings.

Figure 7:
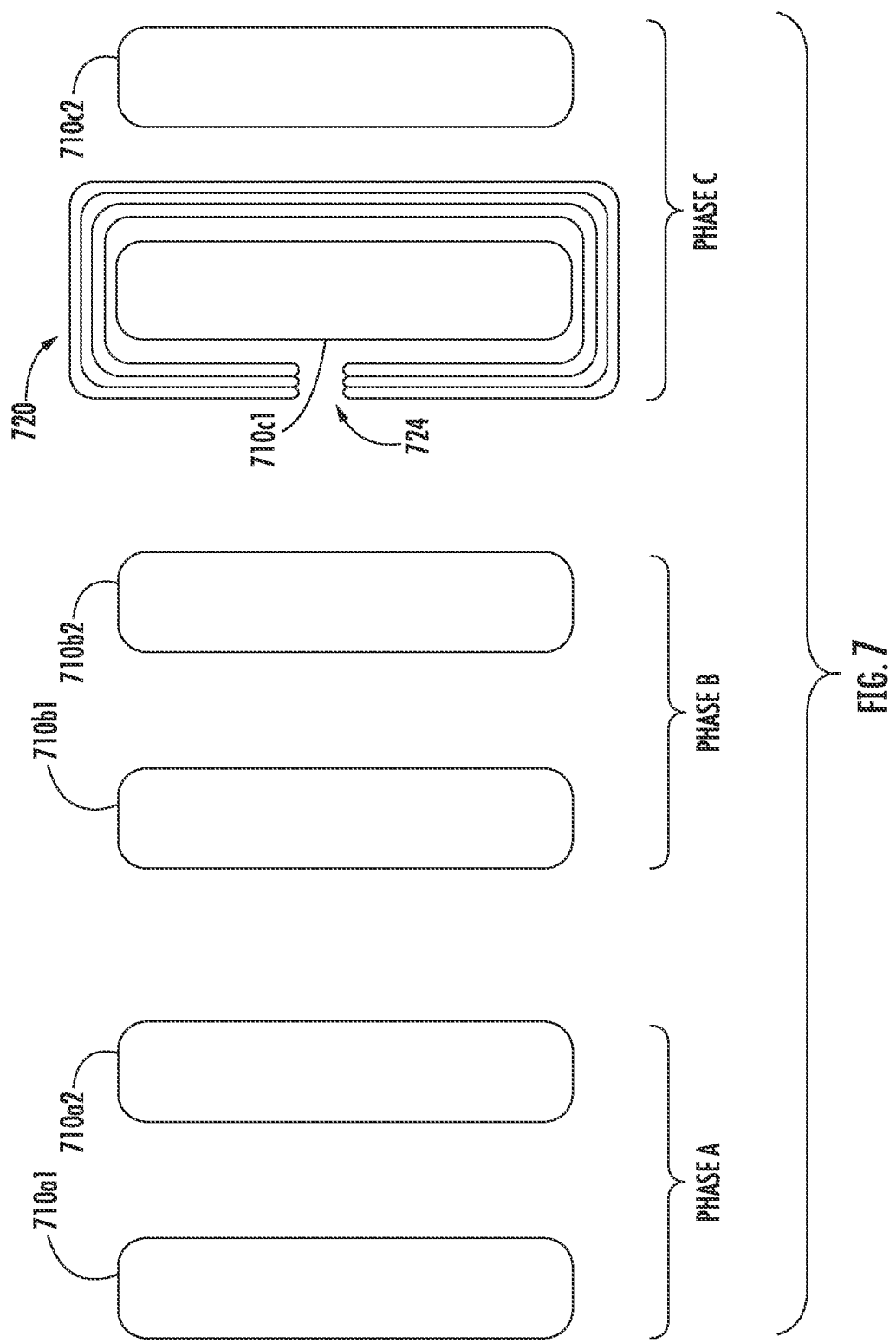
FIGS. 7 and 8 illustrate placement of a laminated magnetic ring in a three-phase bus bar arrangement according to still further embodiments.
Figure 8:
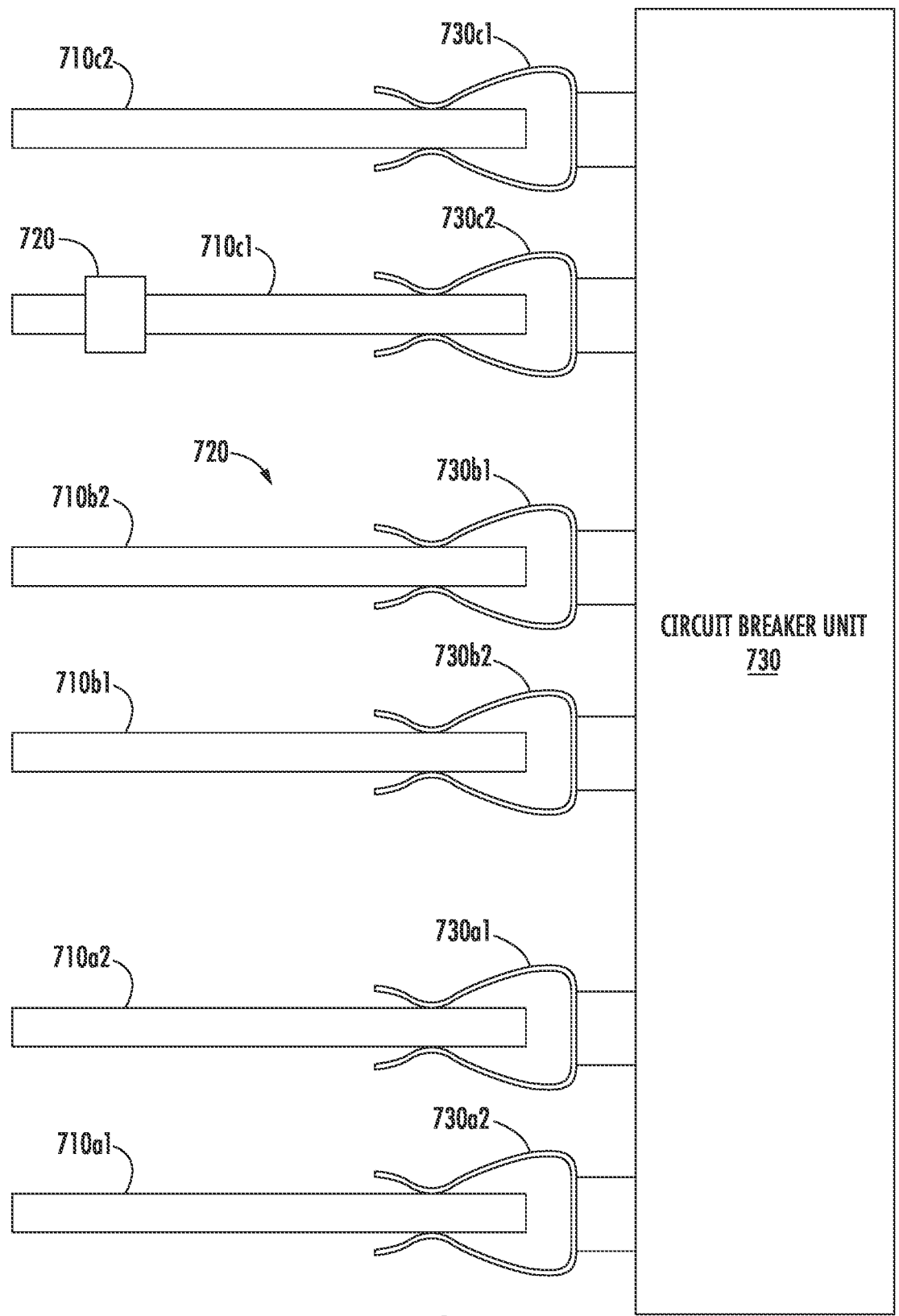

As noted above, positioning of a magnetic core may be dependent on conductor geometry, including the placement of conductors with respect to other conductors for other phases. Referring to FIGS. 7 and 8, in some embodiments, pairs of paralleled bus bar sections 710a1, 710a2, 710b1, 710b2, 710c1, 710c2 for respective phases A, B, C may be aligned in a row and configured to engage corresponding stabs 730a1, 730a2, 730b1, 730b2, 730c1, 730c2 of a circuit breaker unit 730. Coupling among the bus bar sections 710a1, 710a2, 710b1, 710b2, 710c1, 710c2 in such an arrangement may result in creation of a significant circulating current in the paralleled bus bars 710c1, 710c2 for phase C. As explained above, this may lead to inordinate heating in the paralleled bus bars 710c1, 710c2 due to current imbalance created. The current imbalance may be compensated for by positioning a laminated magnetic core ring 720 on the C phase bus section 710c1 to introduce additional inductance to reduce the current in this bus section. Placement of the ring 720 so that an air gap 724 of the ring 720 faces the adjacent B phase bus section 710b2 as shown may further improve performance.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus comprising:
   first and second conductors electrically connected to a third conductor and configured to be coupled to first terminals of respective first and second circuit breaker switches such that the first and second circuit breaker switches are connected in parallel between the third conductor and a fourth conductor that connects second terminals of the first and second circuit breaker switches to one another; and
   at least one magnetic core positioned adjacent at least one of the first and second conductors.

2. The apparatus of claim 1, wherein the at least one core comprises at least one magnetic material body that at least partially surrounds the at least one of the first and second conductors.

3. The apparatus of claim 2, wherein the at least one magnetic material body comprises at least one ring of magnetic material.

4. The apparatus of claim 3, wherein the at least one ring comprises a plurality of laminated layers of the magnetic material.

5. The apparatus of claim 4, wherein the layers of the magnetic material comprise respective layers of grain-oriented steel.

6. The apparatus of claim 3, wherein the at least one ring has at least one air gap.

7. The apparatus of claim 3, wherein the first and second conductors comprise respective first and second bus bars extending in parallel in a first direction and wherein the third conductor comprises a third bus bar extending in a second direction perpendicular to the first direction.

8. The apparatus of claim 7, wherein the first and second bus bars have first ends connected to the third bus bar on opposite sides of the third bus bar and second ends configured to be electrically connected to at least one circuit breaker unit including the first and second circuit breaker switches.

9. The apparatus of claim 8, further comprising:
   fourth and fifth bus bars extending in parallel in the first direction parallel to the first and second bus bars; and
   a sixth bus bar extending in the second direction parallel to the third bus bar,
   wherein first ends of the fourth and fifth bus bars are connected to the sixth bus bar at opposite sides of the sixth bus bar.

10. The apparatus of claim 7, wherein the magnetic ring at least partially surrounds at least one of the first and second bus bars between the first and second ends thereof.

11. The apparatus of claim 1, further comprising a circuit breaker unit comprising the first and second circuit breaker switches.

12. The apparatus of claim 1, wherein the at least one magnetic core introduces an inductance in the at least one of the first and second conductors.

13. An apparatus comprising:
   a circuit breaker comprising first and second switches having first contacts electrically connected to one another;
   first and second bus bars having first ends electrically connected to second contacts of the respective first and second switches of the circuit breaker;
   a third bus bar electrically connecting second ends of the first and second bus bars together such that the first and second switches are connected in parallel between the third bus bar and a node at which the first contacts of the first and second switches are connected to one another; and
   at least one ring of magnetic material at least partially surrounding at least one of the first and second bus bars between the third bus bar and the circuit breaker.

14. The apparatus of claim 13, wherein the at least one ring comprises a plurality of laminated layers of the magnetic material.

15. The apparatus of claim 13, wherein the at least one ring has at least one air gap.

16. The apparatus of claim 13, wherein the first and second bus bars extend in parallel in a first direction and wherein the third bus bar extends in a second direction perpendicular to the first direction.

17. The apparatus of claim 16, wherein the first and second bus bars are attached to the third bus bar at opposite sides of the third bus bar.

18. A method of balancing currents in an apparatus comprising first and second conductors electrically connected to a third conductor and configured to be coupled to respective first and second circuit breaker switches connected in parallel between the third conductor and a fourth conductor, the method comprising:

positioning at least one magnetic core adjacent at least one of the first and second conductors to introduce an inductance in the at least one of the first and second conductors.

19. The method of claim 18, wherein the at least one core comprises at least one magnetic material ring that at least partially surrounds the at least one of the first and second conductors.

20. The method of claim 19, wherein the at least one magnetic material ring comprises a plurality of laminated layers of grain-oriented steel.

* * * * *